C. G. TANQUARY & W. J. CALDWELL.
CAMERA ATTACHMENT.
APPLICATION FILED AUG. 9, 1916.
1,232,993.
Patented July 10, 1917.
3 SHEETS—SHEET 1.
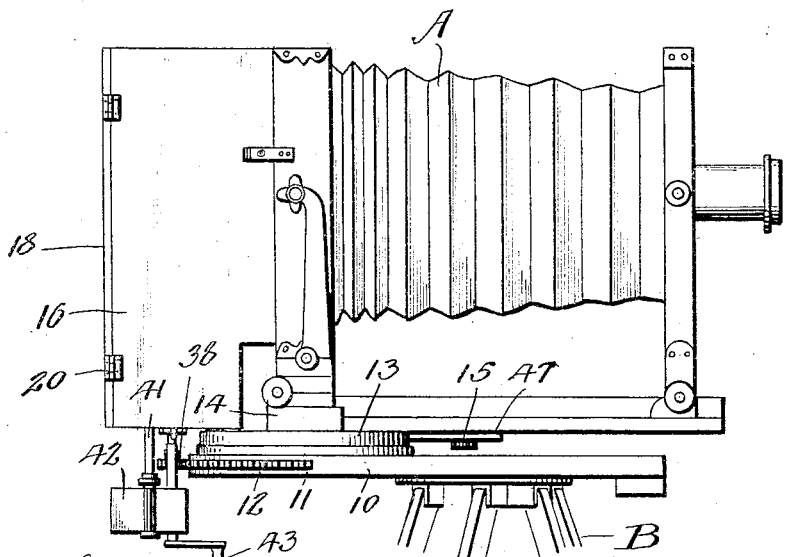
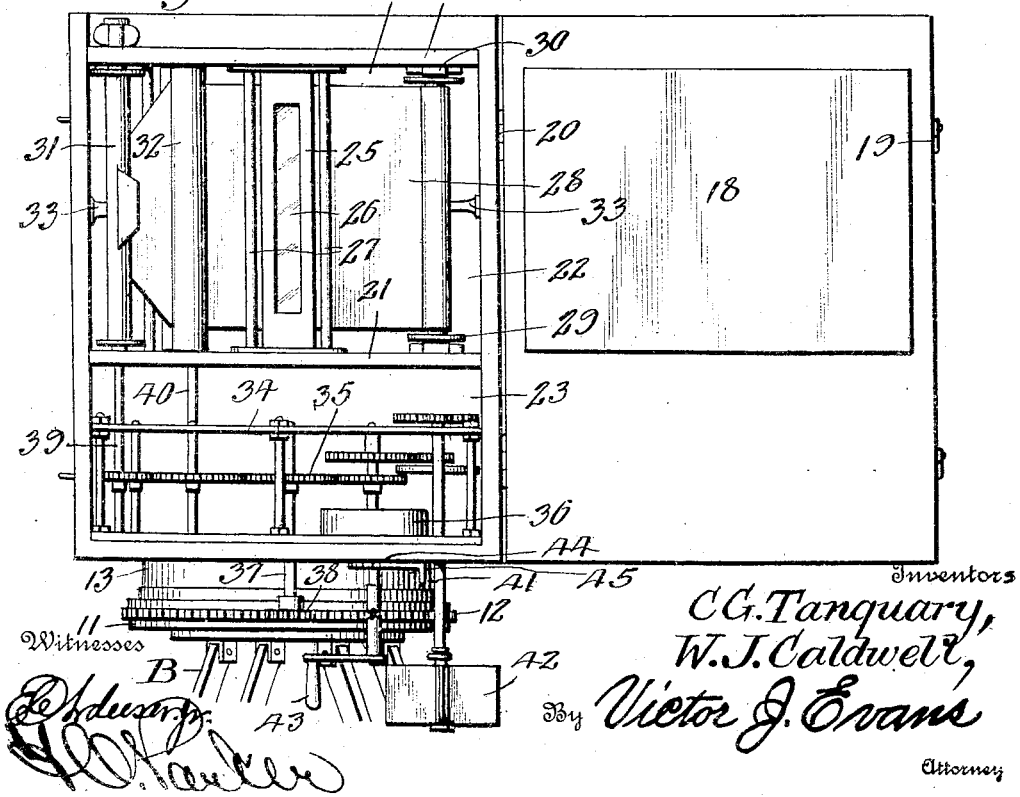

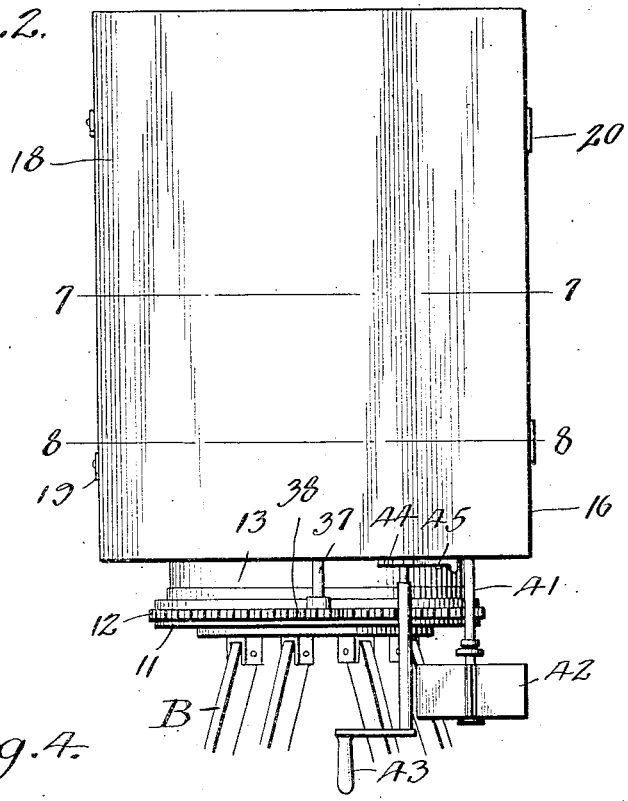
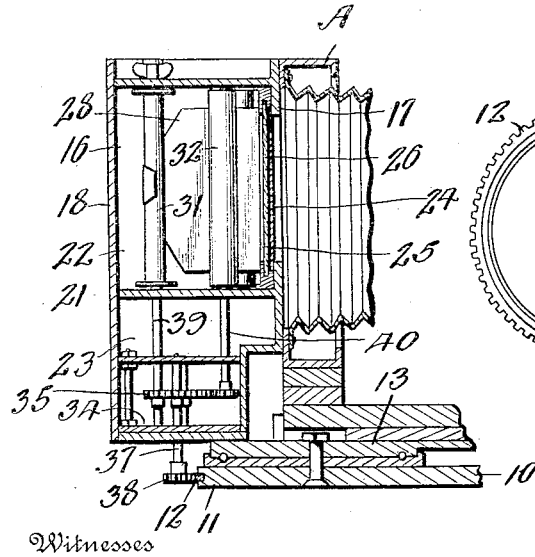
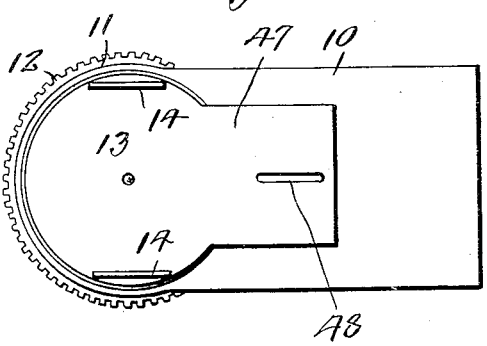

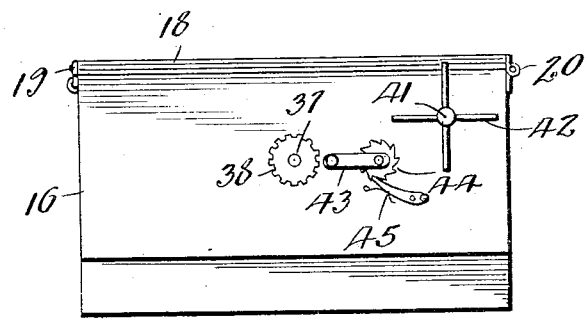

UNITED STATES PATENT OFFICE.

CHARLES G. TANQUARY AND WILLIAM J. CALDWELL, OF HENRYETTA, OKLAHOMA.

CAMERA ATTACHMENT.

1,232,993.     Specification of Letters Patent.     Patented July 10, 1917.

Application filed August 9, 1916. Serial No. 114,040.

*To all whom it may concern:*

Be it known that we, CHARLES G. TANQUARY and WILLIAM J. CALDWELL, citizens of the United States, residing at Henryetta, in the county of Okmulgee and State of Oklahoma, have invented new and useful Improvements in Camera Attachments, of which the following is a specification.

The invention relates to cameras, and more particularly to the class of view camera attachments.

The primary object of the invention is the provision of a camera attachment of this character wherein on the mounting of the same upon a view camera the latter will be automatically turned for the taking of a picture of any required length, the attachment being fitted with a motor for effecting the automatic turning of the camera and also the unwinding of the film within the attachment for the exposure thereof throughout the extent of the view.

Another object of the invention is the provision of an attachment of this character wherein the film will be automatically unwound from its spool at a uniform speed without possibility of any variance in the travel thereof resulting from a variance in the winding and unwinding upon and from the spool.

A further object of the invention is the provision of an attachment of this character wherein the view can be accurately focused when the attachment is upon the camera and the feed of the film is continuous and at a uniform speed and likewise the turning of the camera is continuous and uniform under the action of the motor contained within the attachment, the motor being confined within the lower portion of the latter and will automatically operate for the feeding of the film and the turning of the camera.

A still further object of the invention is the provision of an attachment of this character wherein the camera is rendered capable of making panoramic exposures and is especially designed for use with the usual styles of view cameras using a film spool and also will regulate the length of the film to be exposed and the number of degrees to which the camera shall be revolved.

A still further object of the invention is the provision of an attachment of this character wherein it can be quickly adapted to the camera and removed therefrom.

A still further object of the invention is the provision of an attachment of this character which is extremely simple in construction, thoroughly reliable and efficient in its operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be defined in the appended claims.

In the accompanying drawings:

Figure 1 is a side elevation of a camera showing the attachment constructed in accordance with the invention applied;

Fig. 2 is a rear elevation thereof;

Fig. 3 is a view similar to Fig. 2, showing the door of the attachment open;

Fig. 4 is a fragmentary vertical longitudinal sectional view through the attachment and camera;

Fig. 5 is a top plan view of the camera support and turn table;

Fig. 6 is a bottom plan view of the attachment;

Fig. 7 is a sectional view on the line 7—7 of Fig. 2;

Fig. 8 is a sectional view on the line 8—8 of Fig. 2.

Similar reference characters indicate corresponding parts throughout the several views of the drawings.

Referring to the drawings in detail, A designates generally a view camera and B a portion of the tripod, the same being of the ordinary well known construction, and upon said tripod B at the head thereof is mounted a camera support 10 which is in the form of a base board detachably connected with the tripod in any suitable manner and is formed with a rounded end 11 provided with a toothed rack 12 at the peripheral edge of the same, while upon the rounded end is pivoted or journaled for rotation a turn table or disk 13 provided with a guideway 14 for the bed of the camera A, which latter is detachably fastened upon the disk or table 13 through the medium of the clamp 15, and this disk or table 13 rotatably supports said camera for a purpose presently described.

The attachment comprises a box-like casing or housing 16 formed with a front wall 17, while the open rear is closed through the medium of a swinging door 18 which, when closed, is fastened in any suitable manner, preferably by means of the catches 19, and this door is supported upon hinges 20 which connect the same to the housing or casing 18 for swinging movement so that the door can be readily opened and closed when the occasion requires.

Arranged interiorly of the housing or casing 16 is a transverse partition 21 dividing it into upper and lower compartments 22 and 23 respectively. The housing or casing 16 is adapted to be detachably fastened to the body of the camera A when the ground glass frame which forms a part thereof has been removed, and this attachment can be secured in place upon the camera in any suitable manner so as to provide a light-tight joint between the same. Various means may be employed to removably secure the casing 16 to the camera, for example spring clips may be carried by the top of the camera box and engage pins carried by the said casing, similar to the manner of fastening the usual ground glass frame in position. Formed in the front wall 17 to permit only a small portion of the sensitized film to be exposed to the action of the lens in the camera there is a narrow vertical slot 24 which is located between the lens and its focus, while rearwardly of this slot 24 and spaced from the front wall 17 interiorly of the housing or casing 16 is a ground glass holder 25 having a ground glass 26 registering with the slot 24, while located at opposite sides of the holder 25 are suitably journaled guide rolls 27 over which is adapted to be trained the film 28 so that it will travel between the slotted front wall 17 and the ground glass holder 25, the film 28 being normally wound upon a spool 29 which is detachably journaled for rotation in resilient hangers or bearings 30 which are fixed exteriorly of the housing or casing 16 for supporting said spool. When the film 28 is exposed it is automatically wound upon a spool 31 which takes up the film when unwound from the spool 29, the spool 31 being rotated in a manner presently described.

Arranged spaced from the take-up spool 31 is a pair of closely arranged feed rollers 32, between which is passed the film 28, and these rollers feed the film at a uniform speed for the unwinding of the same from the spool 29 and the taking up of the film by the spool 31, as will be apparent.

Connected interiorly of the housing or casing 16 to the side walls thereof are resilient clips 33 which act upon the film 28 on the unwinding of the same from the spool 29 and the winding thereof upon the spool 31, and these clips 33 serve to smooth the film and prevent undue slackening thereof during the operation of the same.

The holder 25, rollers 27, film 28 and spools 29 and 31 are located within the upper compartment 22 in the housing or casing 16 and also located therein is the pair of feed rollers 32, while arranged within the lower compartment 23 is a gear frame 34 supporting a train of meshing gears 35 driven from a key-wound coiled main spring 36, one of the gears being formed with an arbor or shaft 37 which is extended through the bottom of the housing or casing 16 exteriorly thereof and carries a rack or cog gear 38 meshing with the toothed rack 12 while another gear of the train has connection through the shafts 39 and 40 with the take-up spool 31 and one of the feed rollers 32 respectively for the driving thereof, while another gear of the train has connection with the shaft 41 which is extended through the bottom of the housing or casing 16 and carries a governor fan 42 for controlling the speed of travel of the film operated upon by the motor constituted by the train of gears 35, and the main spring 36, which latter is wound by a key 43 detachably connected to its arbor in any ordinary well known manner.

The feed rollers 32 are formed with resilient surfaces to avoid the slipping of the film thereon, and these rollers pull the film from the spool 29 for the unwinding of the same when making an exposure through the camera for the taking of a picture. When the motor is active it will be noted that a complete panoramic or continuous view can be secured at one exposure of the entire object or objects embraced within the major portion of a circle.

The camera can be readily focused on the opening of the door 18 and the shutter of such camera A by viewing the object or objects through the ground glass 26 in the holder 25 interiorly of the housing or casing 16 of the attachment. The film is fed at a uniform speed irrespective of any variant in the wind thereof upon either spool 29 or 31 because the film is acted upon by the feed rollers 32 which feed the film uniformly and continuously when the motor is in action. The spool 31 is detachably mounted in the housing or casing 16 in any suitable manner so that after an exposure of the film wound thereon it can be readily removed therefrom for the developing of the film as usual. Spaced from the feed roller 32 within the upper compartment 22 is a protective roller 46 which prevents the film 28, when materially slackened, from contacting with the wall of the compartment. The disk or table 13 is formed with an extension 47 in which is formed an elongated slot 48 receiving the clamping screw 15 and in this manner said screw can be adjusted in the slot 48 for varying the position of the camera body, as will be apparent.

It is of course understood that the door 18, when closed, renders the joint between it and the housing or casing 16 light-tight.

The arbor of one of the gears 35 of the train has mounted thereon a ratchet wheel 44 exteriorly of the casing, while pivoted to the casing is a ratchet dog or pawl 45 for engagement with the wheel 44 and this pawl is manually operated to stop and start a motor.

From the foregoing description, taken in connection with the accompanying drawings, the construction and operation of the herein described camera attachment will be readily apparent and, therefore, a more extended explanation has been omitted.

Having thus described our invention, we claim:

1. The combination with a support having a rounded end and a turn table rotatably journaled thereon and adapted to support a camera, of an attachment comprising a casing adapted to be removably secured to the back of a camera and having a slot in its forward wall, a toothed rack at the peripheral edge of the rounded end of the support, guide rollers journaled within the casing at opposite sides of the slot in the forward wall, film spools detachably mounted within the casing, means for feeding a film from one of the spools over the guide rollers and on to the other spool, a motor within the casing and having gear connections with the toothed rack on the support and also connecting with one of the spools and the feed means, and means whereby, the view may be focused when the attachment is in position.

2. The combination with a support having a rounded end and a turn table rotatably journaled thereon and adapted to support a camera, of an attachment comprising a casing adapted to be secured to the back of a camera and having a slot in its forward wall, a toothed rack at the peripheral edge of the rounded end of the support, guide rollers journaled within the casing at opposite sides of the slot in the forward wall, film spools detachably mounted within the casing, auxiliary feed rolls for feeding a film from one of the spools over the guide rollers and on to the other spool, a motor within the casing and having gear connections with the toothed rack on the support and also connecting with one of the spools and the feed means, and a governor coöperative with the motor for controlling the speed thereof.

3. The combination with a support having a rounded end and a turn table rotatably journaled thereon and adapted to support a camera, of an attachment comprising a casing adapted to be secured to the back of a camera and having a slot in its forward wall, a toothed rack at the peripheral edge of the rounded end of the support, guide rollers journaled within the casing at opposite sides of the slot in the forward wall, film spools detachably mounted within the casing, auxiliary means for feeding a film from one of the spools over the guide rollers and on to the other spool, a motor within the casing and having gear connections with the toothed rack on the support and also connecting with one of the spools and the auxiliary feed means, a governor coöperative with the motor for controlling the speed thereof, and a ground glass holder arranged within the casing between the guide rollers and in registration with the slot in the forward wall of said casing.

4. The combination with a support having a rounded end and a turn table rotatably journaled thereon and adapted to support a camera, of an attachment comprising a casing adapted to be secured to the back of a camera and having a slot in its forward wall, a toothed rack at the peripheral edge of the rounded end of the support, guide rollers journaled within the casing at opposite sides of the slot in the forward wall, film spools detachably mounted within the casing, means for feeding a film from one of the spools over the guide rollers and on to the other spool, a motor within the casing and having gear connections with the toothed rack on the support and also connecting with one of the spools and the feed means, a ground glass holder arranged within the casing between the guide rollers and in registration with the slot in the forward wall of said casing, and resilient clips within the casing and acting upon said film when winding upon and from said spool.

In testimony whereof we affix our signatures.

CHARLIE G. TANQUARY.
WILLIAM J. CALDWELL.

Copies of this patent may be obtained for five cents each, by addressing the "Commissioner of Patents, Washington, D. C."